(12) United States Patent
Nguyen et al.

(10) Patent No.: US 7,111,058 B1
(45) Date of Patent: Sep. 19, 2006

(54) SERVER AND METHOD FOR TRANSMITTING STREAMING MEDIA TO CLIENT THROUGH A CONGESTED NETWORK

(75) Inventors: Bich Nguyen, Los Altos, CA (US); Ilya Slain, Santa Clara, CA (US); Kevin J. Connor, Sunnyvale, CA (US); Luke K. Surazski, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 640 days.

(21) Appl. No.: 09/606,787

(22) Filed: Jun. 28, 2000

(51) Int. Cl.
*G06F 15/173* (2006.01)
(52) U.S. Cl. .................. 709/224; 709/234; 709/247
(58) Field of Classification Search ........... 709/224, 709/247, 234, 238; 375/240.16; 714/701, 714/755; 370/390
See application file for complete search history.

(56) References Cited

U.S. PATENT DOCUMENTS

| 4,506,358 | A | | 3/1985 | Montgomery ................ 370/60 |
| 4,710,813 | A | * | 12/1987 | Wallis et al. .......... 375/240.13 |
| 5,206,901 | A | | 4/1993 | Harlow et al. ............. 379/211 |
| 5,287,103 | A | | 2/1994 | Kasprzyk et al. ...... 340/825.52 |
| 5,361,256 | A | | 11/1994 | Doeringer et al. .......... 370/390 |
| 5,534,925 | A | * | 7/1996 | Zhong ..................... 348/384.1 |
| 5,600,635 | A | | 2/1997 | Hamaki et al. ............. 370/280 |
| 5,953,312 | A | | 9/1999 | Crawley et al. ............ 370/218 |
| 5,996,022 | A | * | 11/1999 | Krueger et al. ............. 709/247 |
| 6,021,449 | A | * | 2/2000 | Chow et al. .................. 710/57 |
| 6,064,653 | A | | 5/2000 | Farris ........................ 370/237 |
| 6,078,582 | A | | 6/2000 | Curry et al. ................ 370/356 |
| 6,085,101 | A | | 7/2000 | Jain et al. ................... 370/390 |
| 6,205,139 | B1 | | 3/2001 | Voit ........................... 370/389 |
| 6,240,089 | B1 | | 5/2001 | Okanoue et al. ............ 370/390 |
| 6,240,462 | B1 | | 5/2001 | Agraharam et al. ........ 709/238 |
| 6,243,761 | B1 | * | 6/2001 | Mogul et al. ............... 709/246 |
| 6,272,127 | B1 | | 8/2001 | Golden et al. .............. 370/352 |
| 6,282,192 | B1 | | 8/2001 | Murphy et al. ............. 370/352 |
| 6,292,834 | B1 | * | 9/2001 | Ravi et al. .................. 709/233 |
| 6,330,316 | B1 | | 12/2001 | Donak et al. ............... 379/196 |
| 6,363,065 | B1 | | 3/2002 | Thornton et al. ........... 370/352 |
| 6,421,720 | B1 | * | 7/2002 | Fitzgerald ................... 709/224 |
| 6,452,922 | B1 | | 9/2002 | Ho ............................. 370/352 |
| 6,480,898 | B1 | | 11/2002 | Scott et al. ................. 709/238 |
| 6,490,250 | B1 | * | 12/2002 | Hinchley et al. ........... 370/232 |
| 6,510,219 | B1 | | 1/2003 | Wellard et al. ........ 379/211.01 |

(Continued)

FOREIGN PATENT DOCUMENTS

WO  WO 97/18665  5/1997

OTHER PUBLICATIONS

Bob Emmerson, "Internet Telephony", Byte Magazine, May 1997.

*Primary Examiner*—Ario Etienne
*Assistant Examiner*—Sahera Halim
(74) *Attorney, Agent, or Firm*—Marger Johnnson & McCollom, P.C.

(57) ABSTRACT

A server is provided with a transmit buffer, a transcoder, and a redundancy encoder. The server is for transmitting streaming media to a client through a communication network. A control unit senses when the network is temporarily congested, and activates the transcoder and the redundancy encoder. The frames require fewer bits, and thus arrive in the client's de-jitter buffer without interruption, notwithstanding the network congestion. This prevents network jitter.

21 Claims, 5 Drawing Sheets

U.S. PATENT DOCUMENTS

| | | | |
|---|---|---|---|
| 6,542,499 B1 | 4/2003 | Murphy et al. | 370/352 |
| 6,661,841 B1 * | 12/2003 | Radha et al. | 375/240.1 |
| 6,680,910 B1 * | 1/2004 | Ni | 370/235 |
| 6,728,263 B1 * | 4/2004 | Joy et al. | 370/468 |
| 6,754,232 B1 * | 6/2004 | Tasker | 370/477 |

* cited by examiner

SERVER AND METHOD FOR TRANSMITTING STREAMING MEDIA TO CLIENT THROUGH A CONGESTED NETWORK

BACKGROUND OF THE INVENTION

1. Field of the Invention

The present invention is related to the field of data transmission over networks, and more specifically to devices and methods for adjusting a transmission rate of streaming media depending on available bandwidth.

2. Description of the Related Art

Networks are increasingly used to transmit data. The data can be for various media, such as audio or video, and is usually organized in groups that are called frames. When such data is transmitted continuously, it is also called streaming media. The transmission can either be for live, or for canned media. Either way, the transmission has to be in real-time, or in delayed real-time.

A fundamental requirement for streaming media is that it has to be played at a constant rate. Packet networks, however, may transmit data asynchronously. Therefore, for streaming media to be transmitted over packet networks, strict timing requirements have to be met. Furthermore, where there are two related but separate streams of media (such as audio and video), they have to be time-synchronized in order to achieve high-quality media play out.

A network channel should be used that has a higher bandwidth than what is required by the streaming media. The network, however, is occasionally subject to congestion, which constricts the bandwidth of the channel. This causes play out of streaming media to exhibit the problem of network jitter. This means that what is played out might be momentarily discontinued.

Figure 1:
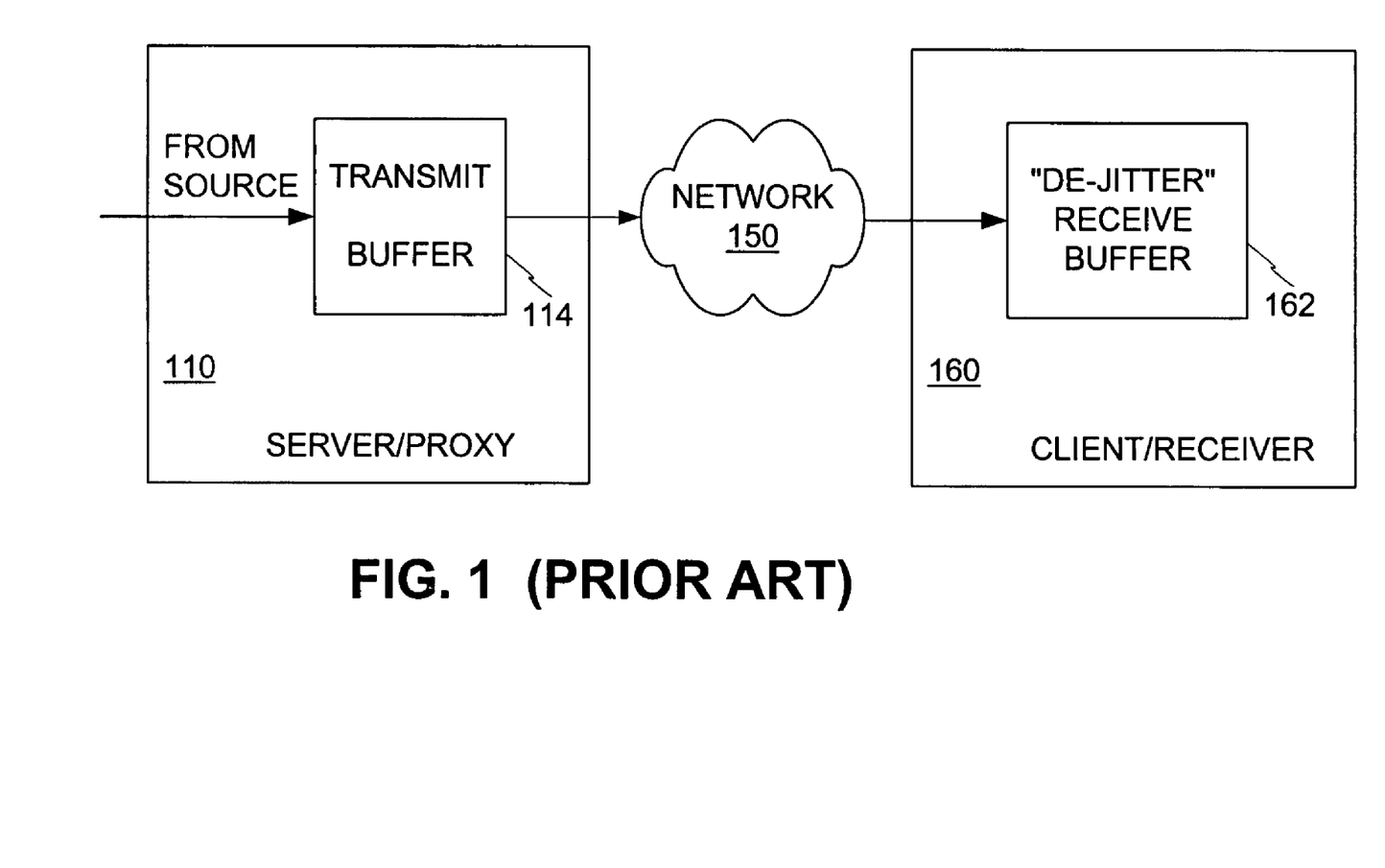
FIG. 1 is a block diagram of a server in the prior art transmitting data to a client over a network.

Referring to FIG. 1, the problem of network jitter has been addressed in the art by introducing a de-jitter buffer at the receiving end. A server or proxy 110 receives data from a source, and stores it in a transmit buffer 114. The proxy 110 then transmits the stored data through a network 150 to a client or receiver 160. Typically, the client 160 includes a fixed size de-jitter receive buffer 162.

The transmit buffer 114 transmits data at the regular rate. It does not transmit any faster, because it if did, it would overflow the buffer 162. The buffer 162 first fills up to its size with data, and then starts playing out at the same rate as it is being filled. Momentary constrictions in bandwidth affect only the fullness of the buffer, not the play out, therefore diminishing network jitter.

The buffer 162 does not work well where there are high-bit rate media streams, which are transmitted through heavily congested networks. In these cases network jitter still occurs, notwithstanding the buffer 162.

Figure 2:
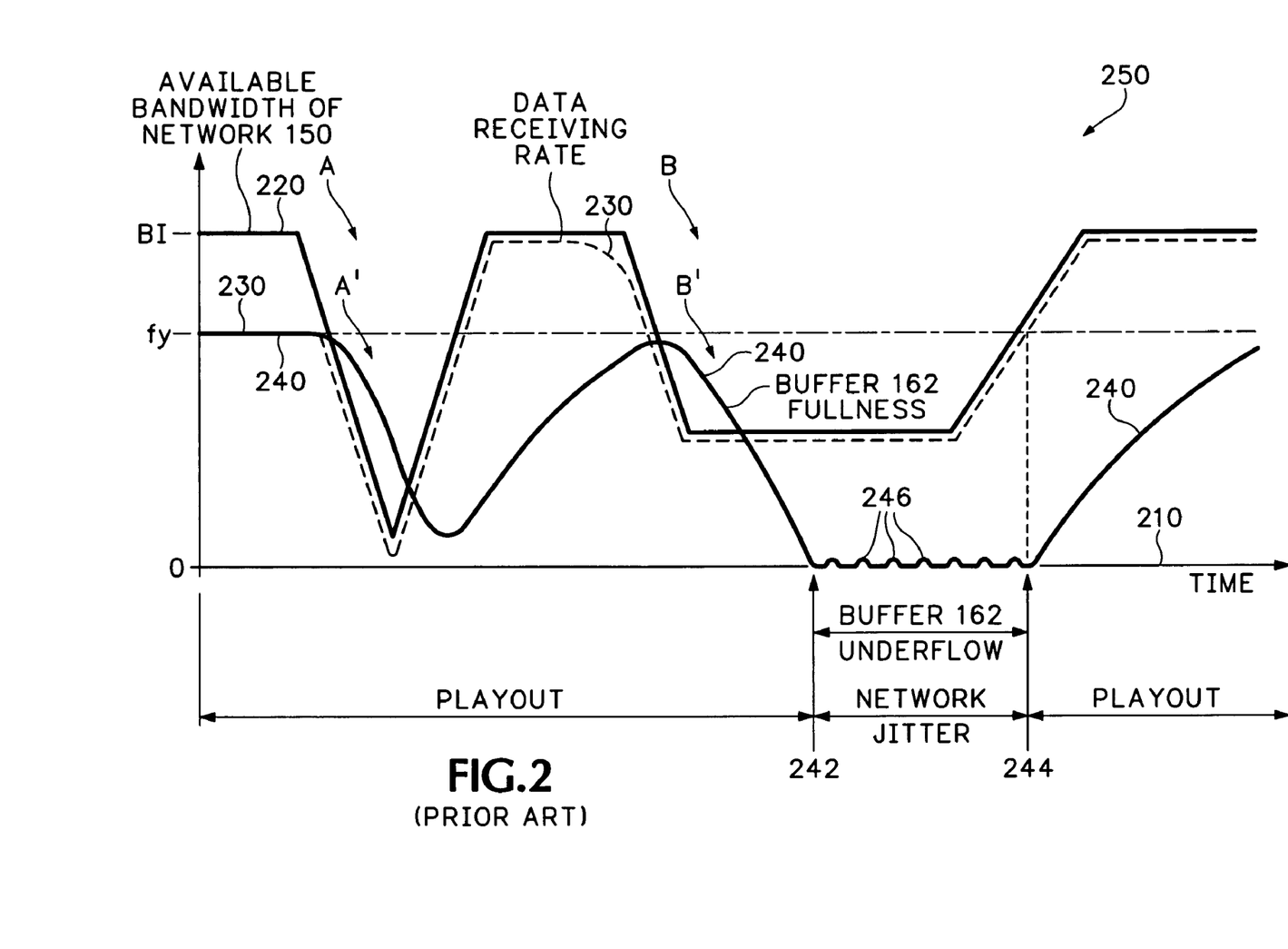
FIG. 2 is a time diagram illustrating why in the arrangement of FIG. 1 there occurs the phenomenon of network jitter that disrupts play out.

Referring to FIG. 2, the phenomenon of network jitter is now described in more detail. Various quantities are plotted against a time axis, which is shown as a line 210.

A solid, piece-wise linear graph 220 represents the time evolution of the available bandwidth of network 150. Notice that the graph 250 has a nominal value BI, but which is not always the case. Indeed, for a heavily congested network, the graph 250 has two main bandwidth constrictions, which are represented by "wells" A and B. These are instances where the available network bandwidth drops to values below BI. Well A is deeper than well B, but does not last as long.

A dashed line 230 represents the instantaneous rate of receiving data through the network. In FIG. 2, the line 230 starts at a value fy, which is the steady state, assuming no prior interruptions in the transmission. The value fy is also the streaming media play out rate. That is how fast the data stream is being transmitted from the proxy 110. In addition, line 230 is always less than the instantaneous value of graph 220. For example, the line 230 tracks the graph 220, as it decreases in well A and well B. Immediately after the wells, however, the dashed line 230 increases, as formerly bottle-necked data is released from the network. After a long, uninterrupted regular receiving time, line 230 settles back at a value fy.

A line 240 represents the instantaneous fullness of the buffer 162. In FIG. 2, initially the buffer 162 is at its nominal size fy, after a long time of network congestion.

The fullness of receiving buffer 162 remains at approximately the same level, until the first dip occurs (well A). Line 240 follows with a corresponding well A', and then recovers. In more mathematical terms, line 240 is determined from a time integral of the difference between line 230 minus the value fy. For example, if well A did not reach below fy, line 240 would not exhibit well A' at all.

Similarly, due to well B, line 240 exhibits a well B', and then recovers. Well B', however, reaches zero, with minor blips 246. This corresponds to a situation of a buffer under flow. Data is still arriving (line 230 is above zero), but slower than it is expected to be played (line 230 is less than value fy). Between time points 242, 244, play out is interrupted. This interruption is called network jitter.

As will be appreciated, network jitter is a disruption in play out of the streaming media. If it is video, then the image stops, or flashes intermittently. If it is audio, then the sound is interrupted. In both cases, network jitter is annoying to the end user.

BRIEF SUMMARY OF THE INVENTION

The present invention overcomes the problems and limitations of the prior art.

Generally, the present invention provides a system and a method that prevents network jitter, even in networks with seriously interrupted bandwidth.

The invention senses the available bandwidth of the network. When the bandwidth is decreased, the invention transcodes the streaming media. This means that each frame is coded with fewer bits, and thus requires less time to be transmitted. This prevents buffer underflow at the receiving end.

Optionally and preferably the transcoded data is also redundancy encoded. So, if packets are dropped during the congestion, less information is not lost.

The invention offers the advantage that network jitter is avoided. The user is not subjected to jitter, and does not miss out on the continuity of the streaming media.

The invention will become more readily apparent from the following Detailed Description, which proceeds with reference to the drawings, in which:

DETAILED DESCRIPTION OF THE PREFERRED EMBODIMENT(S)

As has been mentioned, the present invention provides a server for transmitting streaming media to the network, that accounts for bandwidth availability fluctuations. Various aspects and embodiments of the invention are now described in more detail.

Figure 3:
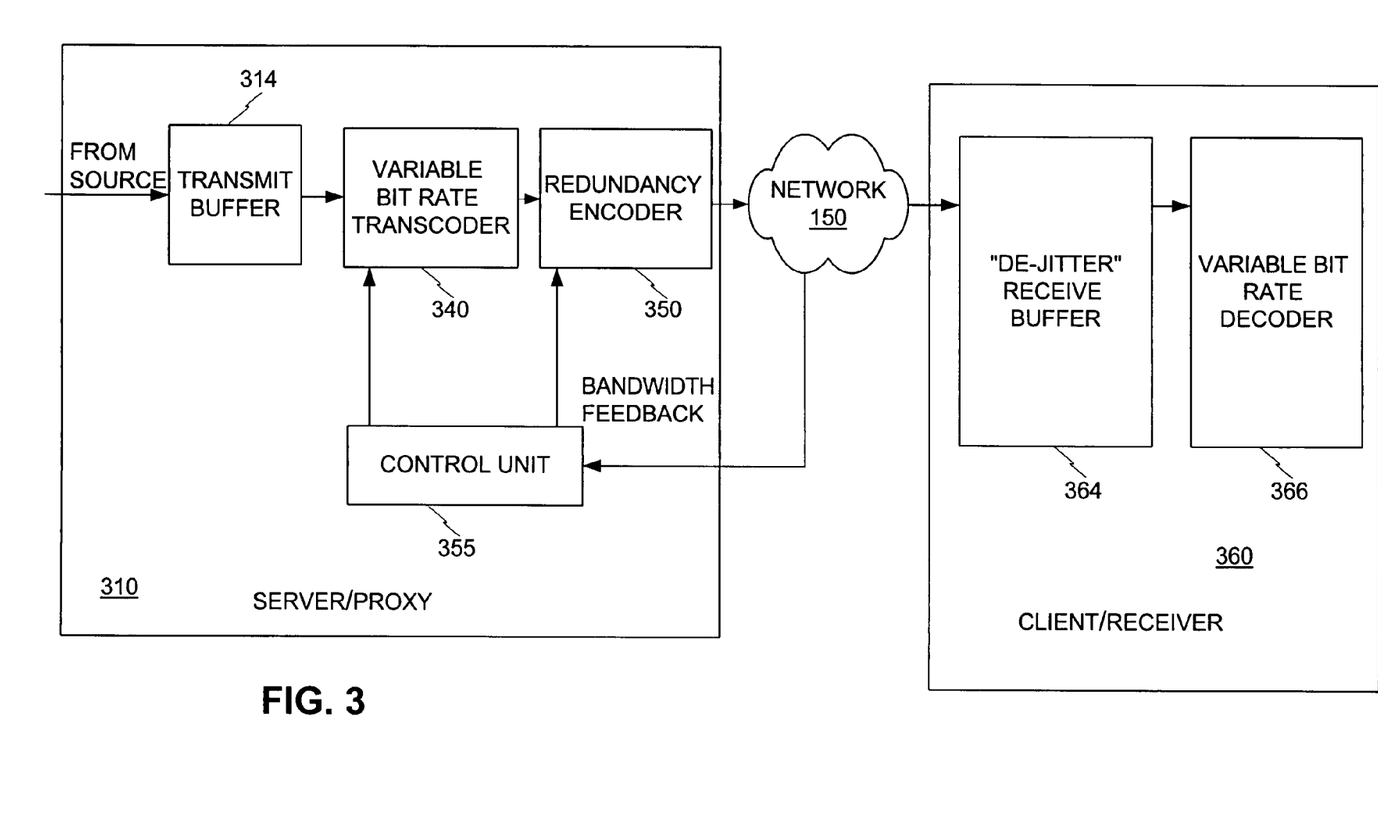
FIG. 3 is a block diagram of a server made according to the invention transmitting data over a network to a client.

Referring to FIG. 3, a device according to the invention is a server 310, which is also known as a proxy 310. As shown, the server 310 can be either a full server, or a portion of a server. The server 310 is for transmitting data over a network 150, such as a packet network, to a client 360. The client 360, which is also known as a receiver 360, includes at least one de-jitter buffer 364. Optionally it also includes a variable bit rate decoder 366.

The server 310 preferably includes a transmit buffer 314, that is also known as transmitting means 314. Buffer 314 is for buffering data received from a source, and for transmitting to the network 150 at the regular rate, such as at a fixed frame rate r required by the streaming media in question. The frame rate r may be, for example, 100 frames per second for all audio, or 25 frames per second for video. The streaming media may have a constant or a variable transmission rate. When transmitting canned media, the transmit buffer 314 is not necessary.

The server 310 moreover includes means for monitoring a bandwidth of the network 150. This feature can be optionally implemented in conjunction with control unit 335. This feature is used to provide an estimate of how fast data is being received at the client 360. This in turn is used to predict how full is the receive buffer 364.

The server 310 also includes a transcoder 340, made as is known in the art, which is otherwise known as transcoding means. The transcoder 340 is for transcoding the buffered streaming media, which is output through the transmit buffer 314. This is preferably enabled only when the monitored bandwidth of the network 150 becomes less than a first preset bandwidth. Once transcoded, the same number of frames uses less bandwidth.

The server 310 preferably also comprises a control unit 355. The control unit 355 is primarily for controlling the transcoder 340. Controlling is mainly by activating the transcoder 340 when the monitored bandwidth is less than the first preset value. In addition, the transcoder 340 is deactivated when the bandwidth of the network is restored to its full bandwidth. The control unit 355 can be implemented as a processor, software in a processor, a separate circuit, etc.

The server 310 preferably also includes a redundancy encoder 350, which is also known as redundancy encoding means 350. The redundancy encoder 350 is for redundancy encoding the transcoded data, if the monitored bandwidth is less than a second preset value. Preferably the control unit 355 activates the redundancy encoder 350 when the monitored bandwidth is less than the second preset value. The second preset value may be the same as the first preset value, although that is not necessary.

It is readily apparent that the present invention can be implemented in logic circuitry, in a dedicated microcontroller circuit, or in a general purpose computer adapted with software. The invention also provides software that can practice methods of the invention.

Figure 4:
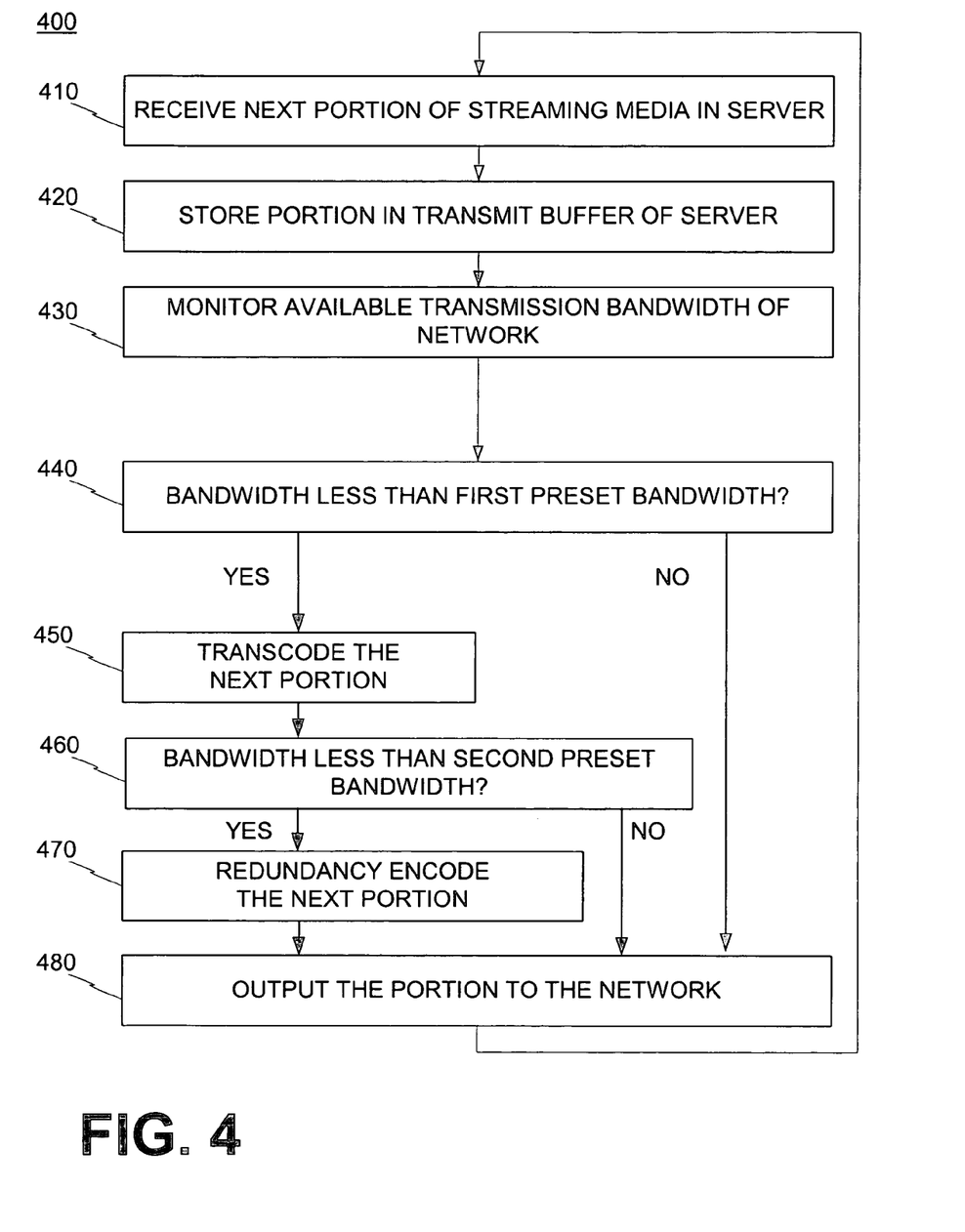
FIG. 4 is a flowchart illustrating a method according to the invention.

Referring to FIG. 4, a method of the invention is described with reference to flowchart 400. The method is for a server to retransmit streaming media to a network. The streaming media is encoded in data, and ultimately destined for a client.

According to an optional box 410, a next portion of the streaming media is received in a server. According to a box 420, the received portion is stored in a transmit buffer of the server.

According to a box 430, the available bandwidth of transmission is monitored. This can be accomplished by monitoring the available bandwidth of the network.

According to a box 440, it is inquired whether the monitored bandwidth is less than a first preset bandwidth. That is a measure of how congested is the network.

If it is, then according to box 450, the next portion of the streaming media is transcoded. It can be transcoded by being played out of the transmit buffer into a transcoder. Alternately, the data that encodes the streaming media can always be routed through the transcoder, which in turn is activated when a certain network congestion is determined.

If the congestion is no longer detected, transcoding can stop. Nevertheless, it is suggested to continue transcoding for a while. This will give the opportunity for the bottlenecked transcoded frames to be entered into the receiving buffer.

Continuing for box 450, according to a box 460, it is inquired whether the monitored bandwidth is less than a second preset bandwidth. The second preset bandwidth can be the same as the first preset bandwidth, in which case the inquiry of box 460 is resolved at box 440.

If the monitored bandwidth is less than the second preset bandwidth then, according to a box 470, the next portion is redundancy encoded. This is accomplished by having the nth packet contain the nth frame, as well as the transcoded (n-m)th frame. Even if packets are dropped during network congestion, and less than m consecutive packets are dropped, the receiver can still decode the frame using the redundant coded data.

Redundancy encoding can be by routing the data through a redundancy encoder, and activating it when a certain network congestion is detected. Alternately, the data can be switched around a different path within the server.

Execution then proceeds to box 480 where, whether transcoded or not, the next portion of the streaming media is transmitted to the network.

Figure 5:
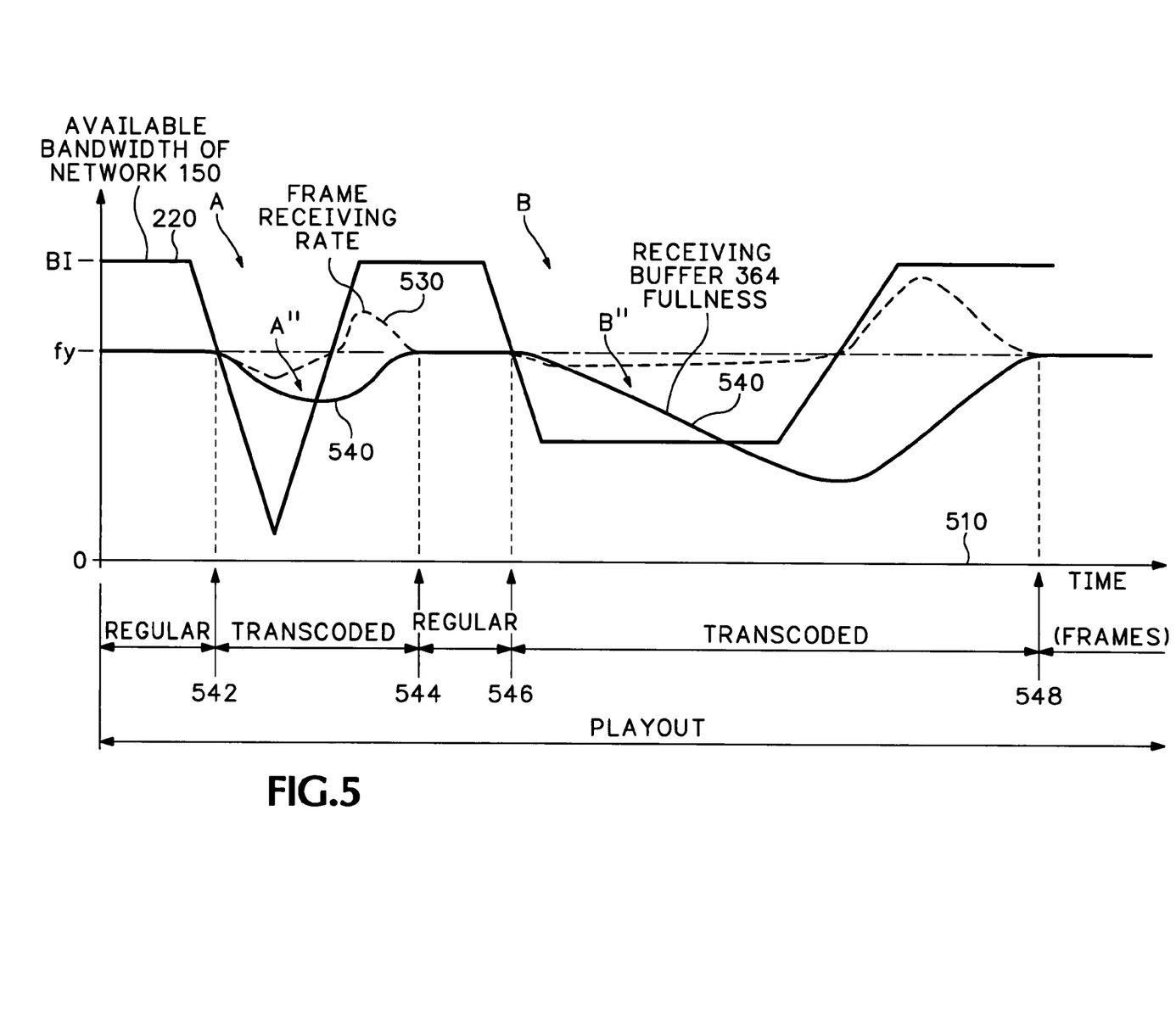
FIG. 5 is a time diagram illustrating why the phenomenon of network jitter is avoided in the arrangement of FIG. 3.

The performance of the invention can be now appreciated with reference to FIG. 5. Various quantities are plotted against a time axis, which is shown as a line 510.

A solid, piece-wise linear graph 220 represents the time evolution of the available bandwidth of network 150. It will be observed that graph 220 is identical in time evolution to graph 220 of FIG. 2, with wells A and B. The similarity is intentional, so that the performance of the system of the invention can be compared to that of the prior art, under the same conditions.

A dashed line 530 represents the instantaneous rate of receiving data through the network 150 in client 360. In FIG. 2, the line 530 starts at a value fy, which is the steady state, assuming no prior interruptions in the transmission. The value fy is again the streaming media play out rate, which is how fast the data stream is being transmitted from the server 310.

Line 530 starts out less than the instantaneous value of graph 220. However, during the well A and well B, the monitoring means instructs the server 310 to activate the transcoder 340. The subsequently arriving data is transcoded. This means that the frames are each having less data, and are therefore being registered faster. So, when well A and well B start, line 530 dips below the line fy, but then compensates by going higher. After a long, uninterrupted regular receiving time, line 530 settles back at a value fy.

A line 540 represents the instantaneous fullness of the buffer 364. In FIG. 5, initially the buffer 364 is at its nominal size fy, after a long time of network congestion. Again, line 540 is given by an integral of a time difference between line 530 minus value fy. As such, it follows with two wells A", B" the wells A, B, respectively. In fact, when line 530 catches up with value fy, that is when wells A", B" bottom out (have a local minimum).

Notice that well B" never reaches zero. The buffer 364 does not underflow. This means that network jitter is avoided, where it was not avoided in the prior art of FIG. 2.

During the congestion periods of wells A and B, however, the received data is transcoded, not regular. This is between the pair of time points 542 and 544 for well A", and the pair of time points 546, 548 for well B".

When the transcoded data is played out, there is a reduction in quality. Nevertheless, the user does not feel he is missing out on any information, and may tolerate the play out during the congested time.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments thereof as disclosed and illustrated herein are not to be considered in a limiting sense. Indeed, it should be readily apparent to those skilled in the art in view of the present description that the invention can be modified in numerous ways. The inventor regards the subject matter of the invention to include all combinations and subcombinations of the various elements, features, functions and/or properties disclosed herein.

The following claims define certain combinations and subcombinations, which are regarded as patentable. Additional claims for other combinations and subcombinations of features, functions, elements and/or properties may be presented in this or a related document.

The invention claimed is:

1. A server comprising:
a transmit buffer for transmitting a plurality of frames of stored data to a network;
a network bandwidth monitor for monitoring a bandwidth of the network preceding each frame transmission;
a transcoder for transcoding a frame into a reduced data content frame if the monitored bandwidth for the corresponding frame transmission is less than a first preset value, where the first preset value is associated with a streaming media play out rate, the transcoding to increase a rate that each reduced data content frame is transmitted from the buffer over the network for the corresponding monitored bandwidth; and
a redundancy encoder for redundancy encoding the transcoded frame if the monitored bandwidth is less than a second preset value, where the second preset value is a network available bandwidth value where some frames carrying data are dropped by the network.

2. The server of claim 1, wherein the transcoder increases the rate that the frames are transmitted above a receiver play out rate for a period of time after the monitored bandwidth of the network rises above the first preset value.

3. The server of claim 1, wherein the network bandwidth monitor includes
a control unit for activating the redundancy encoder when the monitored bandwidth is less than the second preset value.

4. The server of claim 3, wherein the first preset value equals the second preset value.

5. The server of claim 1 where the redundancy encoder retransmits the transcoded frame to the network with at least another frame in the frame buffer.

6. The article of claim 1 including retransmitting the transcoded portion to the network with at least another portion of the streaming media.

7. A server for transmitting data to a network, comprising:
transmitting means for transmitting the data to the network;
monitoring means for monitoring a bandwidth of the network;
transcoding means for transcoding the data if the monitored bandwidth is less than a first preset value; and
redundancy encoding means for redundancy encoding the transcoded data prior to transmission if the monitored bandwidth is less than a second preset value, where the first preset value is a streaming media play out rate and the second preset value is a network available bandwidth value where some frames carrying the data are dropped by the network.

8. The server of claim 7, further comprising:
a control unit for activating the transcoding means when the monitored bandwidth is less than the first preset value and for activating the redundancy encoding means when the monitored bandwidth is less than the second preset value.

9. The server of claim 8, wherein the first preset value equals the second preset value.

10. The server of claim 7 where the transmit buffer sends the frames to the network at a fixed frame rate.

11. An article comprising: a storage medium, said storage medium having stored thereon instructions for a server to transmit a portion of streaming media to a network, that, when executed by a computing device, result in:
monitoring a bandwidth of the network;
transcoding the portion if the monitored bandwidth is less than a first preset value, where the first preset value is associated with a streaming media play out rate, the transcoding to increase a rate that streaming media portions are transmitted over the network in relationship to the monitored bandwidth for each portion;
transmitting the portion to the network; and
redundancy encoding the transcoded portion if the monitored bandwidth is less than a second preset value, where the second preset value corresponds to available network bandwidth where one or more frames carrying data are dropped by the network.

12. The article of claim 11, further comprising:
activating a transcoder when the monitored bandwidth is less than the first preset value.

13. The article of claim 11, further comprising:
activating a redundancy encoder when the monitored bandwidth is less than the second preset value.

14. The server of claim 11 including means for retransmitting the transcoded data to the network with one or more data frames.

15. A method for a server to transmit a portion of streaming media to a network comprising:

monitoring an amount of available bandwidth on the network for the transmission of the portion;

transcoding a reduced portion of the streaming media into frames when the monitored bandwidth is less than a first preset value causing the frames to be transmitted over the network at an increased rate in relationship to the amount of available bandwidth for each frame;

transmitting the portion to the network;

redundancy encoding the transcoded portion if the monitored bandwidth is less than a second preset value; and setting the first preset value at a media stream play out rate and setting the second preset value at an available network bandwidth value where some frames are dropped by the network.

16. The method of claim 15 including:

maintaining the transcoding for a selected period of time after the monitored available bandwidth rises above the first preset value causing the frames to be transmitted above a streaming media play out rate; and discontinuing the transcoding after the selected period of time so that the frames are transmitted at the media play out rate.

17. The method of claim 15 including retransmitting the transcoded portion to the network with at least another portion of the streaming media.

18. A system for a server to transmit streaming media to a network comprising:

means for transmitting the streaming media comprising a plurality of portions to the network;

means for monitoring a bandwidth of the network preceding the transmission of each portion;

means for transcoding a portion prior to transmitting responsive when the monitored bandwidth for the corresponding transmission of the portion is less than a first preset value, where the first preset value is associated with a streaming media play out rate; and means for redundancy encoding the transcoded portion if the monitored bandwidth is less than a second preset value, where the second preset value corresponds to a network bandwidth level where one or more frames carrying data are dropped by the network.

19. The system of claim 18, further comprising:

means for activating the means for transcoding when the monitored bandwidth is less than the first preset value.

20. The system of claim 18, further comprising:

means for activating the means for redundancy encoding when the monitored bandwidth is less than the second preset value.

21. The system of claim 18 including means for retransmitting the transcoded portion to the network with at least another portion of the streaming media.

* * * * *

UNITED STATES PATENT AND TRADEMARK OFFICE
CERTIFICATE OF CORRECTION

| | | |
|---|---|---|
| PATENT NO. | : 7,111,058 B1 | Page 1 of 1 |
| APPLICATION NO. | : 09/606787 | |
| DATED | : September 19, 2006 | |
| INVENTOR(S) | : Nguyen et al. | |

It is certified that error appears in the above-identified patent and that said Letters Patent is hereby corrected as shown below:

On the Title page, under Inventors, please add --Ramanathan T. Jagadeesan, San Jose, CA (IN)-- as it has been omitted.

At column 6, line 40, please replace "claim 7" with --claim 1--

Signed and Sealed this

Twenty-sixth Day of February, 2008

JON W. DUDAS
*Director of the United States Patent and Trademark Office*